United States Patent
McCarrick et al.

[19]

[11] Patent Number: 5,949,049

[45] Date of Patent: Sep. 7, 1999

[54] INVENTORY CONTROL PROBE AND CONTROL MODULE WITH DOCKING STATION

[75] Inventors: Henry Jemison McCarrick, Fallbrook; Kevin Cochrane Ross, San Clemente; William Thomas Leyden, III, Laguna Hills; Khanh Huy Tran, Laguna Niguel; John Fletcher Jordon, III, Solana Beach, all of Calif.

[73] Assignee: Span Instruments, Inc., Plano, Tex.

[21] Appl. No.: 08/683,702

[22] Filed: Jul. 17, 1996

[51] Int. Cl.⁶ .................................................. G06K 7/06
[52] U.S. Cl. ................................. 235/441; 235/375
[58] Field of Search ............................ 235/441, 485, 235/375

[56] References Cited

U.S. PATENT DOCUMENTS

| | | | |
|---|---|---|---|
| D. 367,431 | 2/1996 | Omuru et al. .................. | D10/78 |
| D. 390,111 | 2/1998 | McCarrick et al. . | |
| D. 390,139 | 2/1998 | McCarrick et al. . | |
| 3,102,508 | 9/1963 | Smith, Jr. .................... | 411/437 X |
| 3,239,113 | 3/1966 | Knize ......................... | D9/447 X |
| 4,521,676 | 6/1985 | Poulsen ....................... | 235/375 |
| 4,653,781 | 3/1987 | Sheets et al. ................. | 285/319 |
| 4,827,643 | 5/1989 | Hearst et al. ................. | 40/306 |
| 4,944,536 | 7/1990 | Bartholomew .................. | 285/319 |
| 4,989,160 | 1/1991 | Garrett et al. . | |
| 5,111,196 | 5/1992 | Hunt .......................... | 340/825.35 |
| 5,155,481 | 10/1992 | Brennan, Jr. et al. ........... | 340/870.02 |
| 5,195,860 | 3/1993 | Steyn ......................... | 411/526 |
| 5,322,992 | 6/1994 | Castleman et al. .............. | 235/441 |
| 5,440,477 | 8/1995 | Rohrberg et al. . | |
| 5,505,195 | 4/1996 | Wolf et al. ................... | 128/203.15 |
| 5,517,015 | 5/1996 | Curry et al. .................. | 235/492 |
| 5,539,188 | 7/1996 | Fallah et al. ................. | 235/375 |
| 5,555,655 | 9/1996 | Yager et al. . | |
| 5,634,032 | 5/1997 | Haddock . | |
| 5,697,173 | 12/1997 | McCarrick et al. .............. | 40/310 |
| 5,713,692 | 2/1998 | McCarrick et al. . | |

FOREIGN PATENT DOCUMENTS

| 2238083 | 2/1975 | France | .................................. 411/527 |
|---|---|---|---|

OTHER PUBLICATIONS

Dallas Semiconductor Corporation, "Touch Memory,", Feb. 2, 1994, pp. 1–72.

Primary Examiner—Donald Hajec
Assistant Examiner—Mark Tremblay
Attorney, Agent, or Firm—Gardere & Wynne, L.L.P.

[57] ABSTRACT

An inventory control system includes an inventory control probe, inventory control module, a docking station, a collar clip, and an inventory control collar used on a storage container. The inventory control collar includes a first conductive ring exposed on the top of the collar electrically connected to a memory and a second conductive ring exposed on the top of the collar and electrically connected to the memory. The inventory control probe includes a probe tip and a first pair of contact pins disposed on the probe tip at a predetermined distance apart such that the contacts concurrently contact the conductive rings of the inventory control collar. A probe body housing is connected at a first end to the probe tip, and a pair of data transfer terminal contacts are disposed on a bottom portion of the probe body housing. A handle is connected at a second end to the probe body housing. The inventory control module includes a control module housing, a pair of data transfer terminal contacts disposed on a bottom portion of the control module housing for engaging the pair of data transfer terminal contacts disposed on the docking station housing, a microprocessor, and a memory. Both the probe and control module can connect to the docking station.

21 Claims, 7 Drawing Sheets

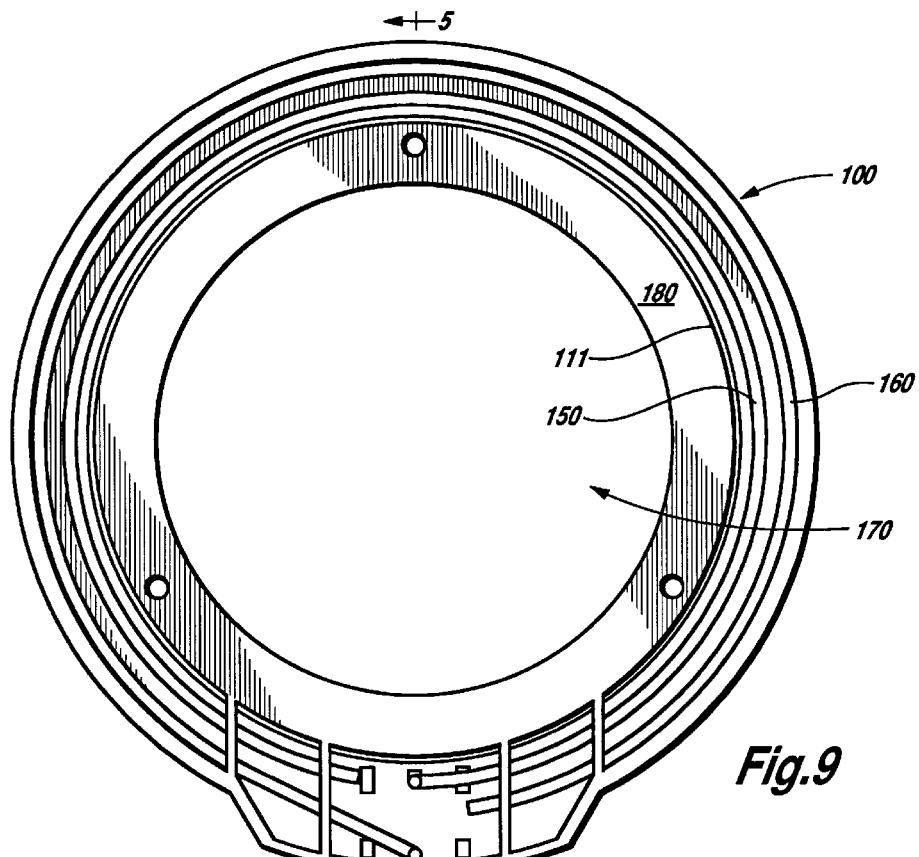
Fig.9
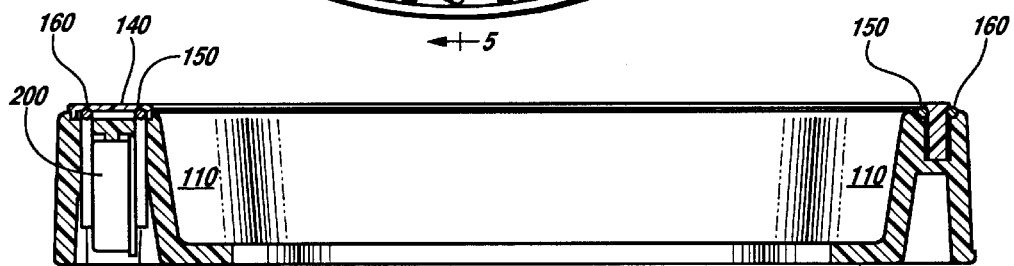
Fig.10
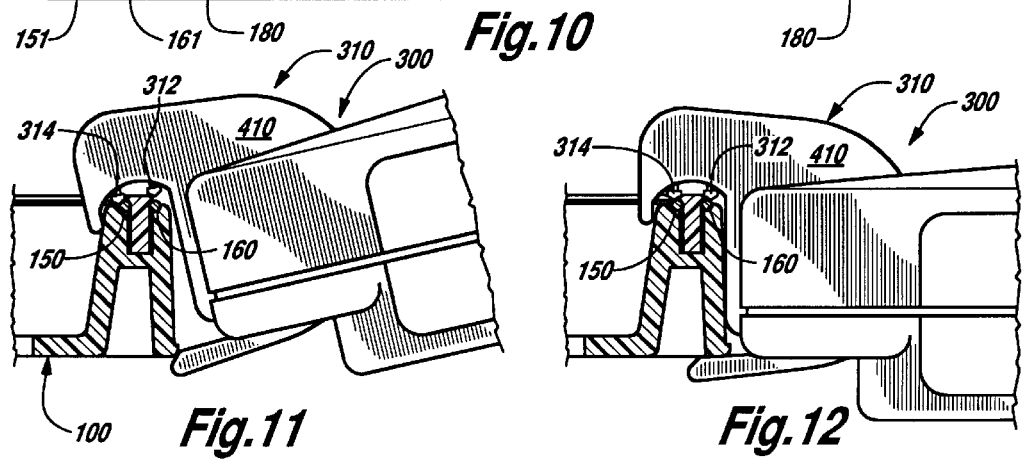
Fig.11
Fig.12

INVENTORY CONTROL PROBE AND CONTROL MODULE WITH DOCKING STATION

TECHNICAL FIELD

This invention relates to an inventory control probe for containers and, more particularly, to an inventory control probe incorporating a microprocessor for reading and writing information to and from an inventory control collar incorporating a resident memory; and a control module incorporating a microprocessor, with an associated docking station for reading and writing inventory information to and from an inventory control collar, incorporating a resident memory.

RELATED APPLICATIONS

The present application is a component of an inventory control system including co-pending U.S. Application Serial No. 08/683,774, filed concurrently herewith, titled INVENTORY CONTROL COLLAR, (Attorney Docket No. 78618-240), now U.S. Pat. No. 5,697,173 co-pending U.S. application Ser. No. 08/683,715, filed concurrently herewith, titled INVENTORY CONTROL COLLAR LOCKING RING, (Attorney Docket No. 78618-266), now U.S. Pat. No. 5,713,692.

BACKGROUND OF THE INVENTION

Inventory control systems must be able to manage critical information about each item in inventory in a timely and cost effective manner. Typical types of information maintained in an inventory control system include manufacturing data, certification data, shipping data, transfer data and use data. Down time and waste in manufacturing processes may be avoided with adequate and timely inventory information.

SUMMARY OF THE INVENTION

The inventory control probe of the present invention comprises an apparatus for reading and writing information to an inventory control collar placed on the neck of a container such as a gas storage cylinder and having a resident memory. The inventory control probe is part of a total inventory control system described in the U.S. patent applications recited in the related applications section above, the disclosure of each is incorporated herein.

Typical inventory control information that is read and written by the inventory probe to the resident memory of the inventory collar includes such general inventory control information as a collar identification number, container serial number, owner name and site, product code, product material, DOT hazard classification, content fill level, tare weight, content level during use, fill site and date and shelf life. Typical shipping information that may be stored includes origin point (including company name, site and code), shipping manifest number, shipping date, destination point (including company name and site), destination order number and product, destination receiving date and by whom received. Typical transfer information may include the transfer point (including company name and site), manifest number, destination point (including company name and site), order number, destination receiving data and by whom. Certification data may include record number, certifier, analysis and specification limits. Additionally, important manufacturing information such as plant upset conditions, process steps and notations may be recorded on the resident memory. Data is written and read from the inventory control collar by concurrently touching the probe tip contact pins to two circumferential conductor rings exposed on the upper surface of the inventory control collar.

The data read and written to the inventory control collar is stored in a memory of the inventory control probe until it is downloaded to a host computer system or used to perform an independent action based on a programmed response. An example of a programmed response would be to accept or reject inventory items based on user defined criteria (i.e. gas type).

The inventory control collar includes a first conductive ring exposed on the top of the collar electrically connected to a memory, and a second conductive ring exposed on the top of the collar and electrically connected to the memory.

The inventory control probe for reading and writing data to and from an inventory control collar includes a probe tip; a first pair of contact pins disposed on the probe tip at a predetermined distance apart such that the contact pins concurrently contact the conductive rings of the inventory control collar; a probe body housing movably connected at a first end to the probe tip; a pair of data transfer terminal contacts disposed on a bottom portion of the body housing used for communicating stored data and program instructions to the docking station; and a handle housing connected at a second end to the probe body housing containing batteries to support portable use.

The inventory control docking station for reading and writing data to and from an inventory control collar includes a probe tip, a first pair of contact pins disposed on the probe tip at a predetermined distance apart such that the contact pins may concurrently contact the conductive rings of the inventory control collar; a docking station housing connected by an electrical conductor to the probe tip housing; and a pair of data transfer terminal contacts disposed on the docking station body housing containing batteries to support portable use.

The inventory control module for reading and writing data to and from the inventory control docking station includes a control module housing; a pair of data transfer terminal contacts disposed on a bottom portion of the control module housing for engaging the pair of data transfer terminal contacts disposed on the docking station housing; a microprocessor; and a memory.

BRIEF DESCRIPTION OF THE DRAWINGS

A more complete understanding of the present invention may be had by reference to the following Detailed Description when taken in conjunction with the accompanying drawings wherein:

FIG. 9 is a top view of the inventory control collar without the insulating retainer ring and nose cover in position;

FIG. 10 is a cross section view of the inventory control collar;

FIGS. 11 and 12 are partial views of a portion of the inventory control probe engaging the inventory control collar;

DETAILED DESCRIPTION OF THE INVENTION

Figure 1:
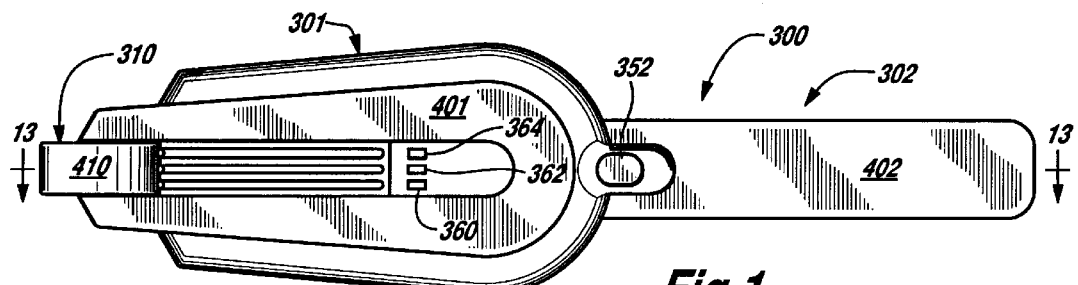
FIG. 1 is a top view of the inventory control probe of the present invention.

Reference is now made to the Drawings wherein like reference characters denote like or similar parts throughout the 21 figures. Turning to FIGS. 1–5, therein is disclosed a hand-held inventory control probe 300. The probe comprises three general sections: an elongated body section 301; a probe tip 310 movably attached to a first end of the body section, and a handle 302 attached to the second end of the body section 301. The probe body section 301 has a corresponding housing 401, the handle 302 has a corresponding housing 402 and the probe tip 310 has a corresponding housing 410.

Figure 2:
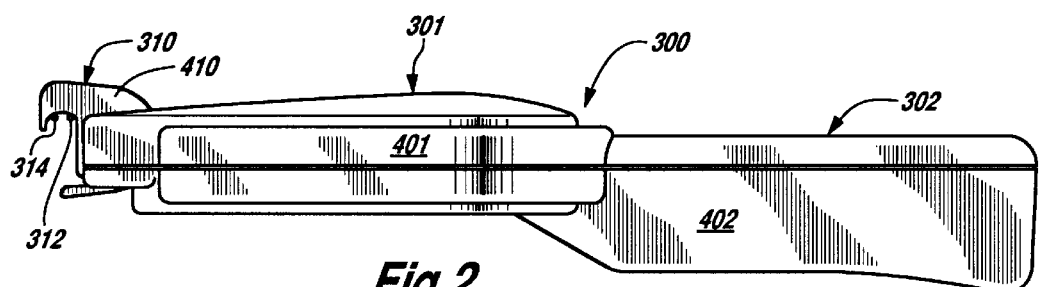
FIG. 2 is a side view of the inventory control probe.

Referring to FIGS. 2, 11 and 12, the probe tip housing 410 is generally "C" shaped. Disposed on the inner side of the top of the "C" of the probe tip housing 410 are contact pins 312 and 314 for transmitting data to and reading data from a memory of the inventory control collar 100 (FIG. 6) by contacting the conductive rings 150 and 160 exposed on the upper surface of the inventory control collar (FIG. 7). The lower portion of the "C" shaped probe tip housing 410 assists in grasping and securing the probe tip 310 to the inventory control collar 100 during data transmission.

Figure 13:
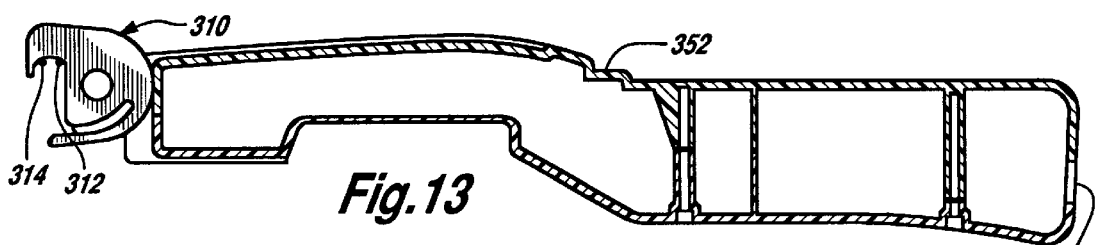
FIG. 13 is a cross section view of the inventory control probe taken along line 13—13 of FIG. 1.

Referring to FIGS. 1 and 13, the inventory control probe 300 includes an operating switch (not shown) that is activated by a button 352 disposed on the top of the housing 401. Also located on the top of the housing 401 are a plurality of LEDs 360, 362 and 364. LED's can be programmed to illuminate for different requirements. The most common program will allow the green LED 364 to illuminate when the correct gas data set is read by the probe 300. The red LED 360 will illuminate when the wrong gas data set is read by the probe 300. The amber LED 362 will illuminate when proper contact is not achieved between the probe tip contact pins 314 and 312 and the collar conductor rings 150 and 160.

Figure 3:
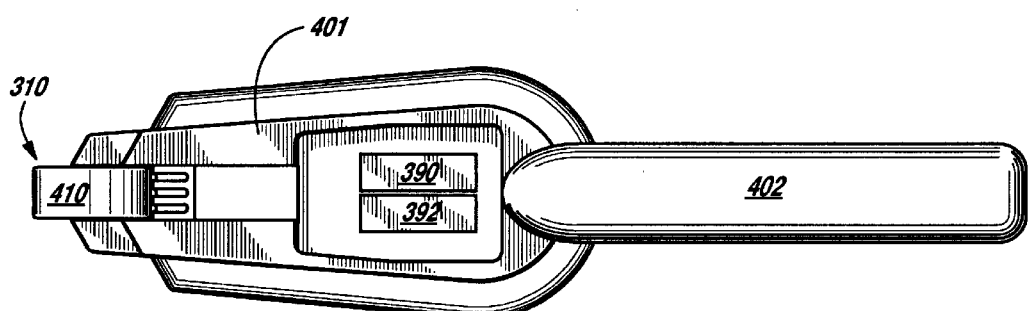
FIG. 3 is a bottom view of the inventory control probe.
Figure 4:
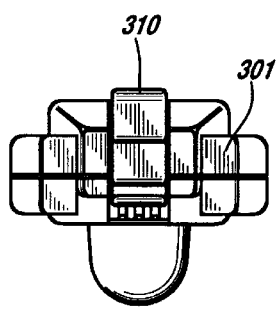
FIG. 4 is a front view of the inventory control probe.
Figure 5:
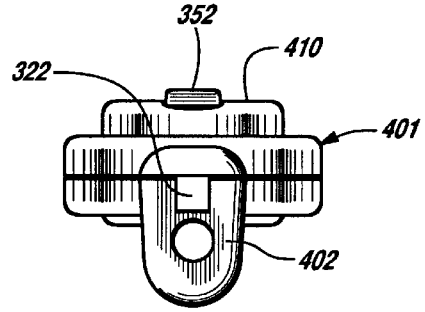
FIG. 5 is a rear view of the inventory control probe.

Referring now to FIGS. 3 and 5, a set of transfer contacts 390 and 392 are located on the bottom of housing 401 of the inventory control probe 300 for connection to the docking station (FIG. 14) and a connector 322 from the RS 232 link to a host computer.

Figure 7:
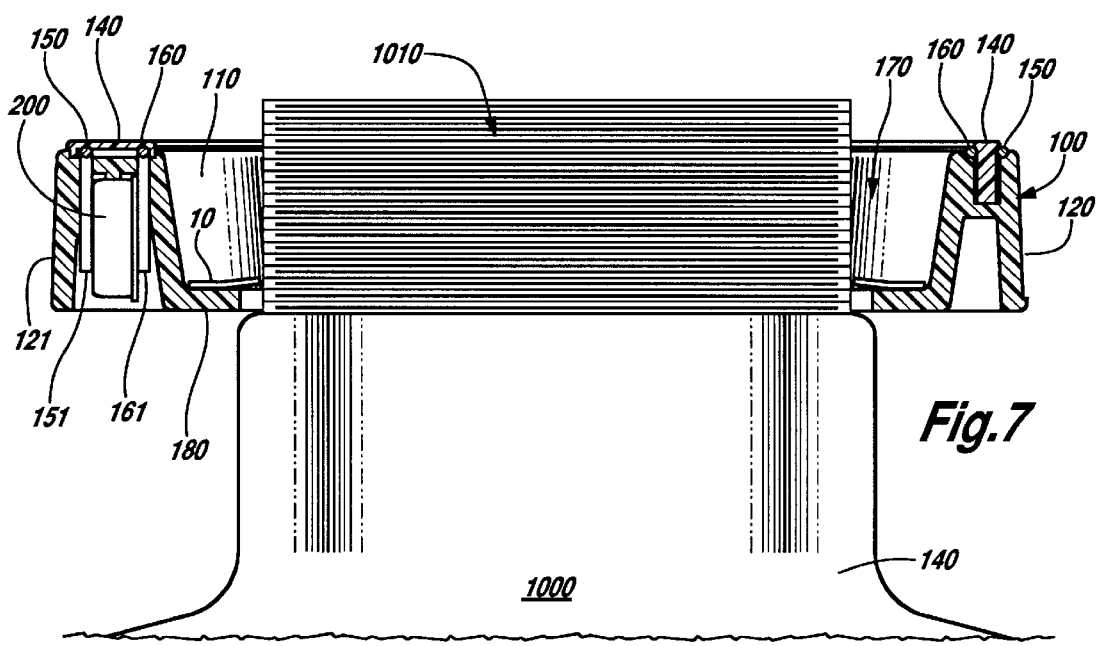
FIG. 7 is a cross section view illustrating the inventory control collar and an inventory control collar locking ring positioned around the threaded neck of a storage container.
Figure 8:
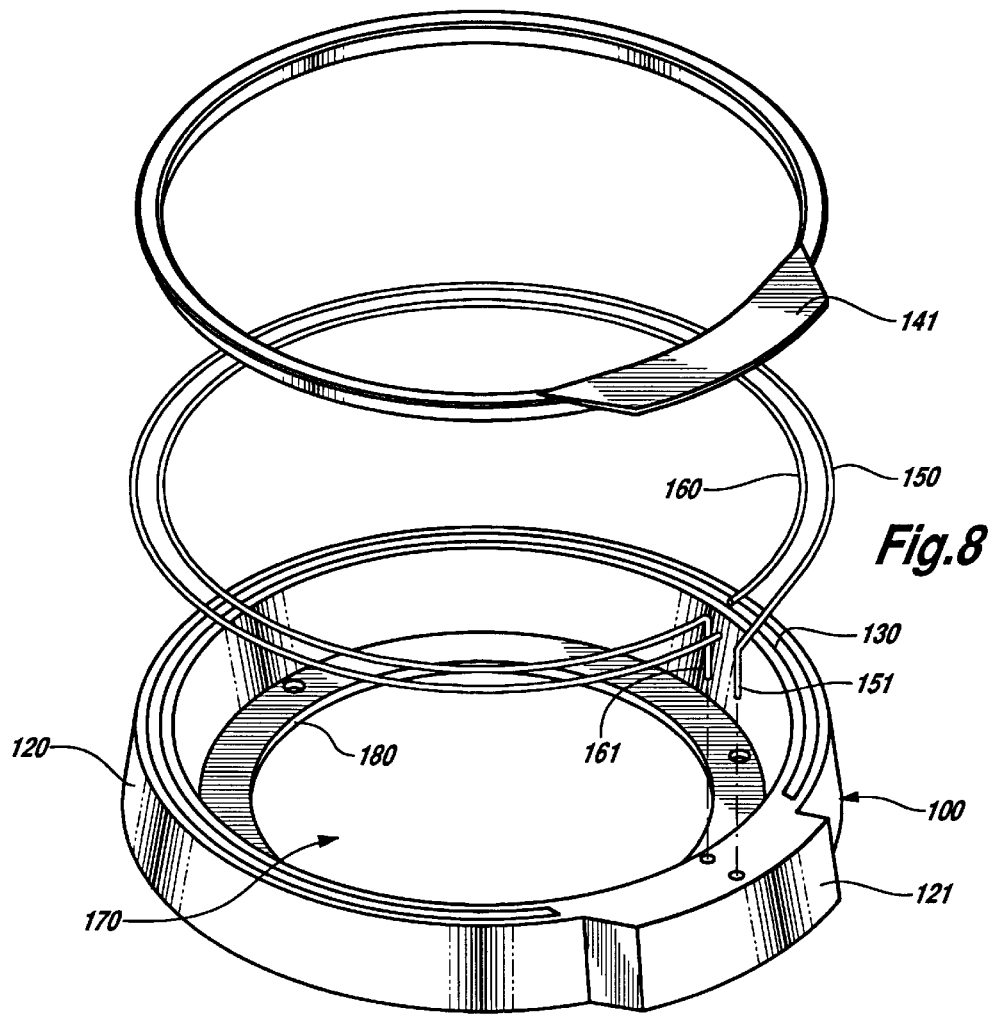
FIG. 8 is an exploded perspective view of components of the inventory control collar.

Referring to FIG. 8, therein is shown an exploded view of an inventory control collar 100. The inventory control collar 100 includes a polymeric collar housing 120 having a truncated conal exterior shape with a nose 121 projecting from the exterior circumference. The nose 121 contains a touch memory cannister 200 (as seen in FIGS. 7 and 10). An outer first conductive ring 150 and an inner second conductive ring 160 are seated in a "T" shaped groove 130 in the top of the collar housing 120. "T" shaped insulating retainer ring 140 is inserted from the top between the first conductive ring 150 and the second ring 160. The conductive ring 150 begins at the nose 121 and extends circumferentially around the top of the collar housing 120 and terminates in a down-turned portion 151 at the nose 121. Likewise, the second ring 160 begins at the nose 121 and extends circumferentially around the top of the collar housing 120 and terminates in a down-turned portion 161 at the nose 121. The "T" shaped retainer ring 140 is a one piece unit that begins at the nose 121 and extends circumferentially around the collar housing 120 and terminates at a nose cover 141 which is bonded with the retainer ring 140.

Referring to FIGS. 7, 9 and 10, the down-turned portions 161 and 151 penetrate the top of the nose 121 to connect with the data and ground contact points of the touch memory cannister 200 (not shown).

As can be seen in FIG. 7, the housing 120 includes a central opening 170 of sufficient diameter to pass the storage container threaded neck 1010 therethrough. Referring now to FIGS. 6–10, the housing 120 includes a bottom ledge 180 projecting inwardly into the opening 170. The inventory control collar locking ring 10 seats in the depression 110 and rests on the bottom ledge 180.

Turning to FIGS. 1, 11, 12 and 14, data is written and read from the touch memory cannister 200 of the inventory control collar 100 with the inventory control probe 300 by concurrently touching the probe tip 310 having contact pins 312 and 314 or collar clip 710 having contact pins 712 and 714 to the conductive rings 150 and 160 exposed on the upper surface of the inventory control collar 100. Data is transmitted by means of the metal-to-metal contact between the conductive rings 150 and 160, attached to the touch memory cannister 200, and the contact pins 312 and 314 of the inventory control probe 300 or contact pins 712 and 714 of the collar clip 710.

Figure 6:
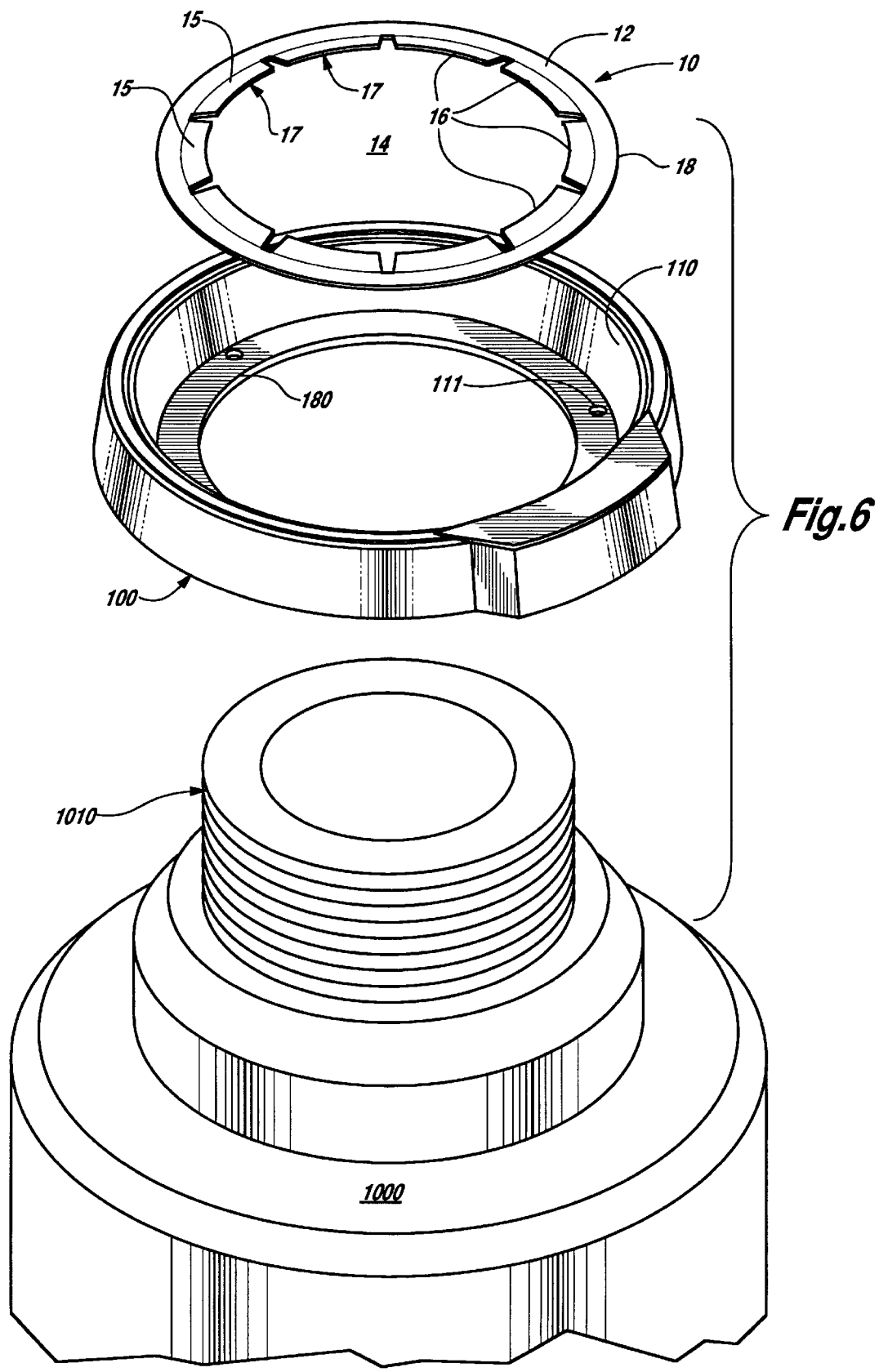
FIG. 6 is an exploded perspective view illustrating an inventory control collar and inventory control locking ring used with a storage container.

Referring to FIG. 6, there is illustrated an inventory control collar locking ring 10 for securing the inventory control collar 100 around the threaded neck 1010 of a storage container 1000.

Referring to FIG. 7, when in use, the inventory control collar locking ring 10 is positioned over the threaded neck 1010 of the storage container 1000 and on top of the previously installed inventory control collar 100. The locking ring 10 is sized to be received on a locking surface 180 in the inventory control collar 100 thereby securing the inventory control collar 100 on the storage container 1000.

Referring now to FIG. 6, the locking ring 10 comprises a circular disc 12 with a central opening 14 sized to fit around the threaded neck 1010 of the storage container 1000 and a plurality of inwardly disposed flexible tabs 16 spaced equally around the perimeter of the central opening 14. The tabs 16 are formed integrally with the disc 12 and extend radially inward into the central opening 14, having a distance of projection sufficient to engage the threaded neck 1010 of the storage container 1000. In the preferred embodiment, the ten tabs 16 are equally spaced around the perimeter of the central opening 14. The outer perimeter 18 of the locking ring 10 is substantially the same as an the inner perimeter 111 of the depression 110 of the inventory control collar 100.

As can be seen in FIG. 6, the tab 16 has an upper surface 15 angularly disposed slightly upward from the plane of the disc 12 and an under surface 17 angularly disposed at a slightly greater angle from the plane of the disc 12 than the upper surface 15. In the preferred embodiment, the angular displacement of the under surface 17 from the plane of the disc 12 is approximately 25 degrees. The angular disposition of the tab surfaces provide added strength to the locking ring 10. When in an assembled state, these tabs form an interference fit with the threaded neck 1010.

Figure 14:
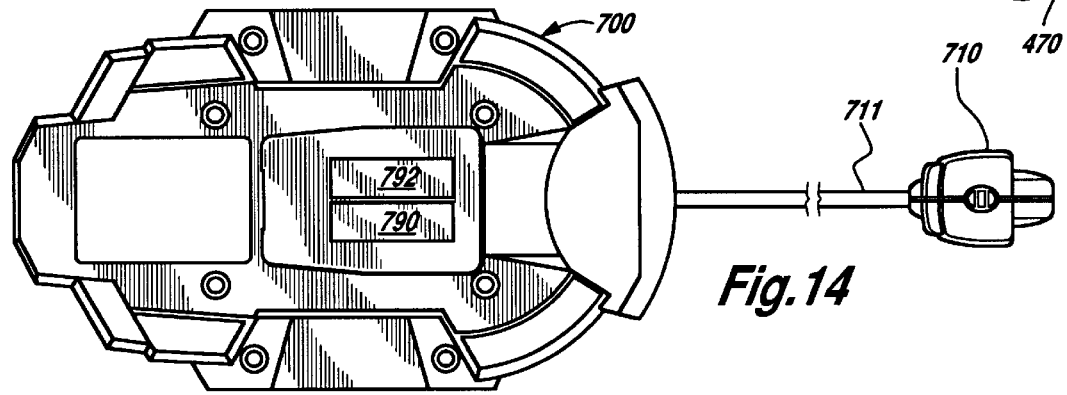
FIG. 14 is top view of a docking station of the present invention used in an inventory control system.
Figure 15:
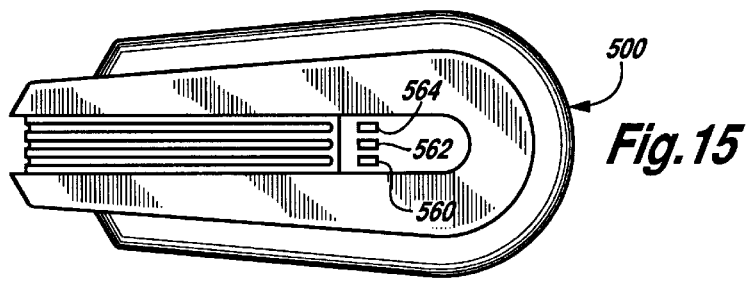
FIG. 15 is a top view of a control module of the present invention used in an inventory control system.
Figure 16:
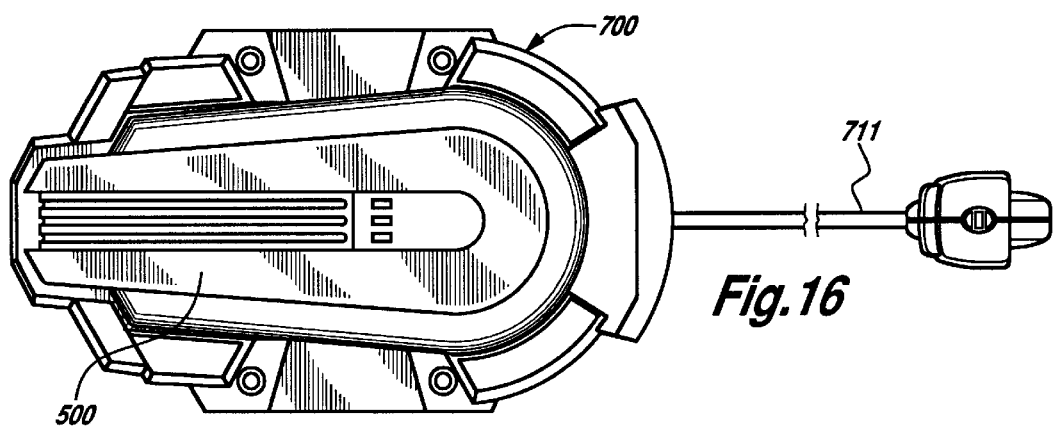
FIG. 16 is a top view of the control module positioned in the docking station.
Figure 17:
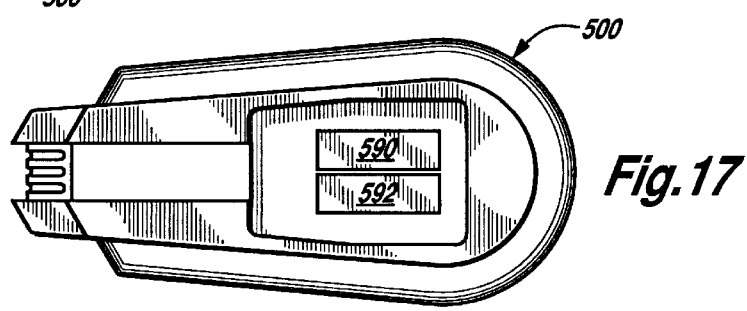
FIG. 17 is a bottom view of the control module.
Figure 18:
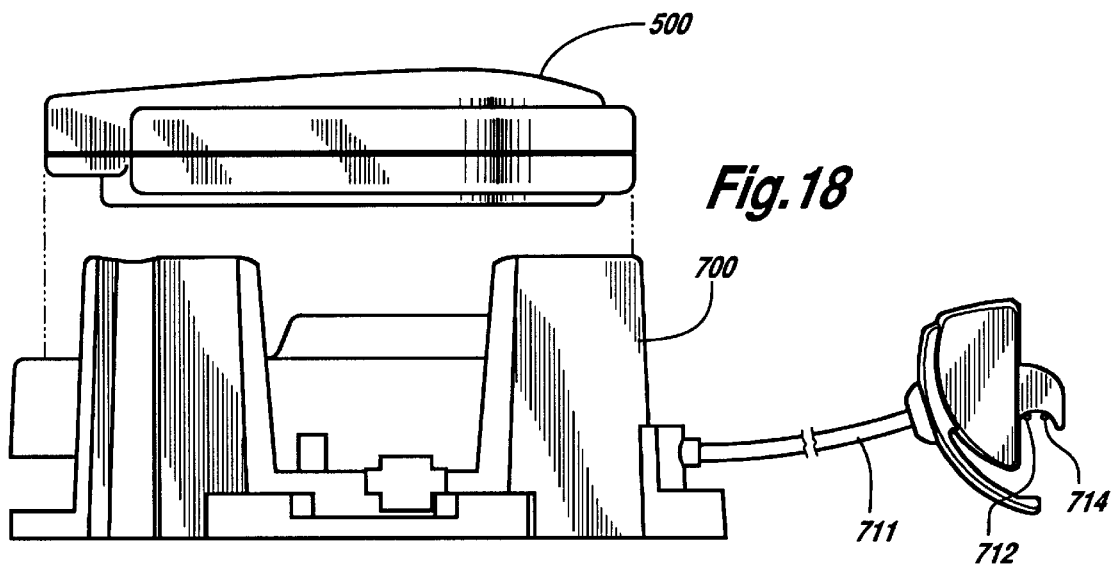
FIG. 18 is a side view of the control module and docking station.
Figure 19:
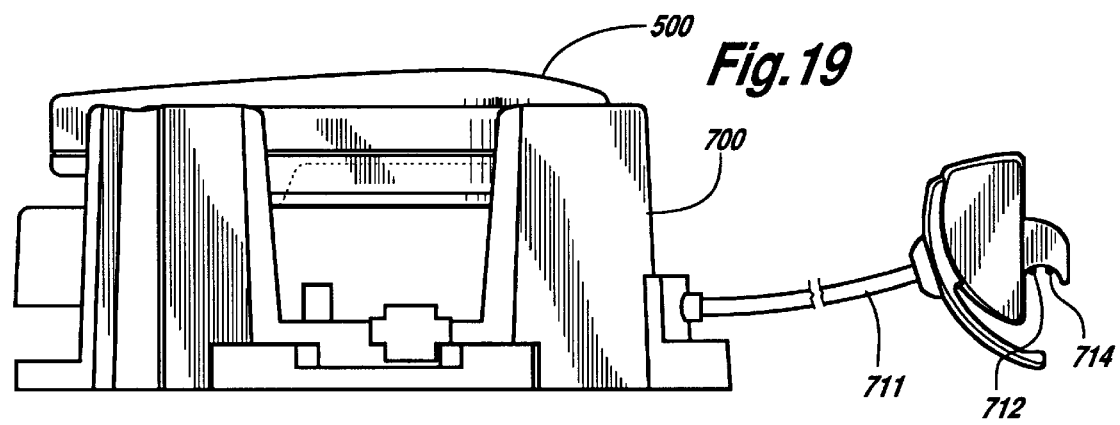
FIG. 19 is a side view of the control module positioned in the docking station.

Referring now to FIGS. 14–19, there is illustrated a control module 500 and a docking station 700. Inventory control module 500 and docking station 700 work in concert to perform inventory control management. A "C" shaped collar clip 710 (see FIG. 18) is a part of the docking station for attachment to the inventory control collar 100 in the same manner as probe tip 310. The collar clip 710 includes contact pins 714 and 712 that engage the conductive rings 150 and 160 that are exposed on the upper surface of the inventory control collar 100. The lower portion of the collar clip 710 assists in grasping and securing the collar clip to the inventory control collar 100 during data transmission. The collar clip 710 includes an interconnecting line 711 that connects the collar clip with the docking station 700. As shown in FIGS. 14 and 17, the control module 500 includes contacts 590 and 592 on the housing bottom that mate with contacts 790 and 792 disposed on the top of the docking station 700. FIG. 19 illustrates the inventory control module 500 in a docked position in the docking station 700. When in the docked position, the control module 500 operates to transmit and receive data from an inventory control collar 100 or a data tag (not shown) in the same manner as the self-contained inventory control probe 300. An output from a plurality of LEDs 560, 562 and 564 (FIG. 15) indicates the status of various functions in the control module, and operate via a predefined program in the same way as the inventory control probe 300 LED's 360, 362 and 364.

Figure 20:
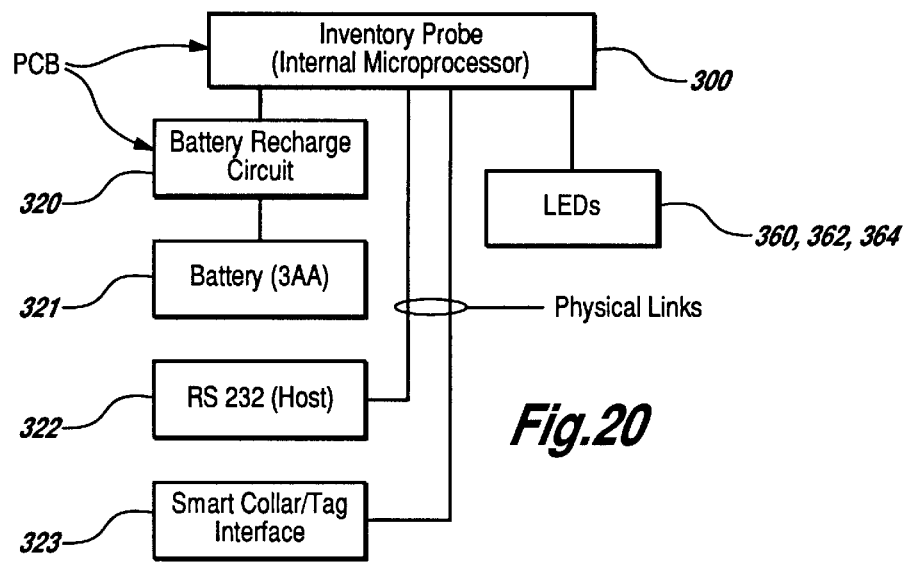
FIG. 20 is a block diagram of the circuity for the inventory control probe of FIG. 1.

Referring to FIG. 20, there is shown a block diagram for the inventory control probe 300. The inventory control probe 300 includes a internal micro-processor and battery recharge circuit 320 and battery 321. In the preferred embodiment the micro-processor includes a 32K ROM and 32K RAM. The inventory control probe 300 further includes terminal 322 for a probe tip physical link RJ11 connector to a host computer and terminal 323 for a probe tip physical link to an inventory control collar 100 or smart tag interface.

Figure 21:
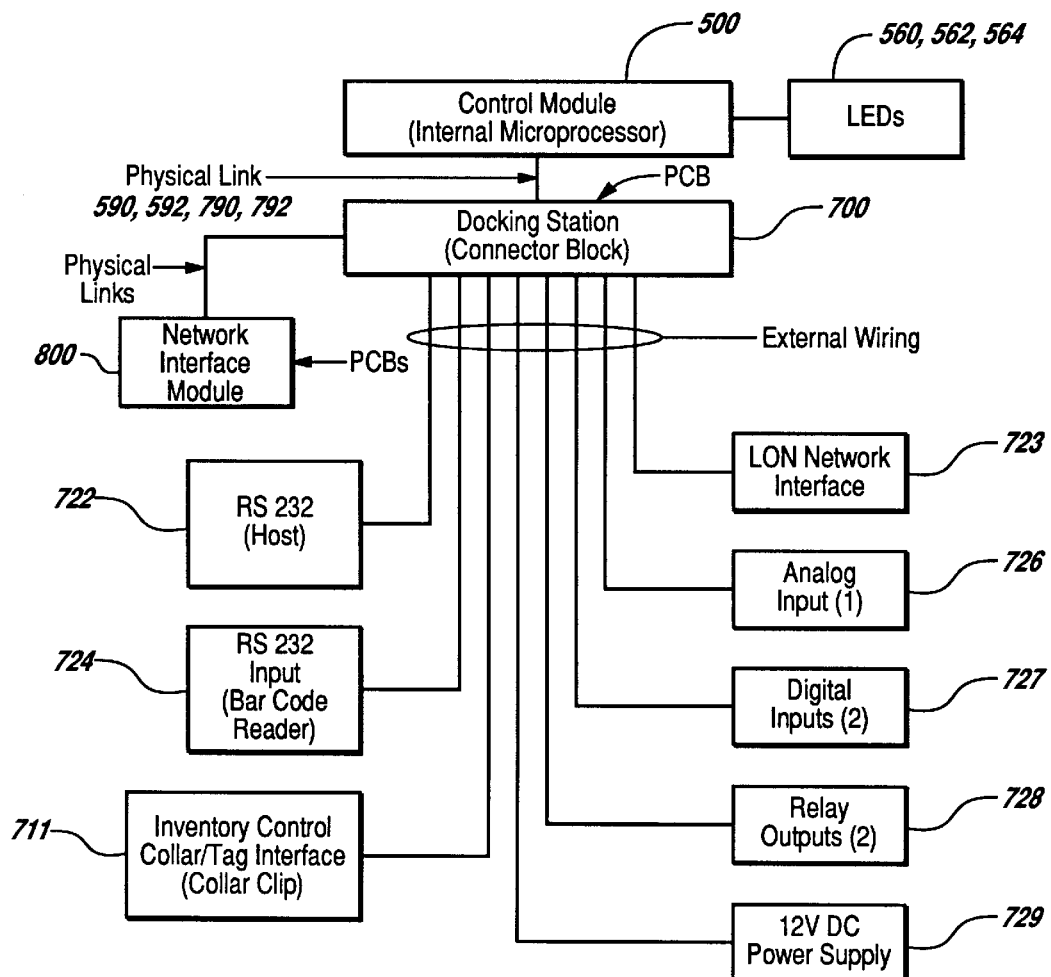
FIG. 21 is a block diagram of the control module of FIG. 15 and the docking station.

Referring now to FIG. 21, there is illustrated a block diagram for the control module 500 and docking station 700. The control module 500 includes an internal micro-processor. In the preferred embodiment, the micro-processor includes a 32K ROM and 32K RAM. The control module 500 further includes terminals 590 and 592 providing a physical link to the docking station 700 via docking station terminals 790 and 792. The docking station 700 includes an external connector (RJ11) for physical link 722 to host computer; and external connecting line 711 for a physical link (RJ11) to an inventory control collar 100 or a smart tag interface; an external connector for a physical link 724 to an input bar code reader; an external connector for a physical link 726 for one analog input; physical links 727 for two digital inputs; physical links 728 for two relay outputs; an external connector for a physical link 729 to an external 12 V.D.C. power supply and; a link 723 to an LON network interface. The docking station 700 further includes an internal connector for a physical link to a separate (PCB) network interface module 800.

Although preferred and alternative embodiments of the invention have been illustrated in the accompanying Drawings and described in the foregoing Detailed Description, it will be understood that the invention is not limited to the embodiments disclosed but are capable of numerous modifications without departing from the scope of the invention as claimed.

We claim:

1. An inventory control probe for reading and writing data to and from an inventory control collar for use on a storage container, the inventory control collar having a first conductive ring exposed on the top of the collar and electrically connected to a resident memory; and a second conductive ring exposed on the top of the collar spaced from the first ring and electrically connected to the resident memory, the inventory control probe comprising:

a probe tip;

a pair of contact pins disposed on the probe tip at a predetermined distance apart such that the contact pins are configured to concurrently contact the conductive rings of the inventory control collar when the probe tip is removably engaged with the control collar;

a microprocessor for reading and writing data to and from the resident memory of the inventory control collar;

a memory for storing such data;

a probe body housing connected at a first end to the probe tip;

a pair of data transfer contacts disposed on the probe body housing; and a handle connected at a second end to the probe body housing remote from the probe tip, the handle having a configuration suitable for hand placement of the probe into engagement with the collar.

2. The inventory control probe of claim 1 further including:

a plurality of indicators connected to the microprocessor for indicating operation modes wherein the operating modes include a first mode in which probe identification information matches identification information read from the collar, a second mode in which probe identification information fails to match identification information read from the collar, and a third mode indicating failure of the probe to contact the resident memory of the collar.

3. The inventory control probe of claim 1 further including:

an external connector for a physical link to a host computer.

4. An inventory control docking station for transferring data and program instructions to and from an inventory control module or an inventory control probe and an inventory control collar for use on a storage container, the inventory control collar having a first conductive ring exposed on a top of the collar and electrically connected to a resident memory and a second conductive ring exposed on the top of the collar and electrically connected to the resident memory, the inventory control docking station comprising:

a collar clip;

a first pair of contact pins disposed on a collar clip tip at a predetermined distance apart such that the contact pins may concurrently contact the conductive rings of the inventory control collar when the collar clip is removably clipped onto the collar;

a docking station housing connected by an electrical conductor to the collar clip, the docking station housing defining a socket into which a control module can be inserted and removed; and a pair of data transfer terminal contacts disposed on the docking station housing facing the socket so that corresponding terminals on a control module come into contact with the data transfer terminal contacts upon insertion into the socket.

5. The docking station of claim 4 further including:

an external data transfer connector for a physical link to a host computer.

6. The docking station of claim 4 further including:

an external data transfer connector for a physical link to an input bar code reader.

7. The docking station of claim 4 further including: an external connector for one analog input, two digital inputs and two relay outputs.

8. The docking station of claim 4 further including:

an external connector for a power supply.

9. The docking station of claim 4, further including:

a control module for reading and writing data to and from the inventory control collar via the inventory control docking station and the collar clip the control module comprising:

a control module housing configured to fit into the socket of the docking station;

a pair of data transfer terminal contacts disposed on the control module housing for engaging the pair of data transfer terminal contacts disposed on the docking station body housing;

a microprocessor for reading and writing data to and from the resident memory of the inventory control collar; and a memory for storing such data.

10. The control module of claim 9 further including:

an internal connector for a physical link to a network interface module.

11. The inventory control probe of claim 1, wherein the probe further comprises a power source for energizing the microprocessor.

12. The inventory control probe of claim 1, wherein the contact pins project from the probe tip and are configured to engage first and second conductive rings which are concentric with the collar and each other such that one of such rings has a greater diameter than the other, the collar being configured to fit onto a neck of the storage container.

13. The inventory control probe of claim 1, wherein the data transfer contacts are disposed on a bottom portion of the probe body housing.

14. The inventory control probe of claim 1, wherein the probe further comprises means for manually activating the probe.

15. The inventory control probe of claim 1, wherein the probe further comprises a power source for energizing the microprocessor, means accessible on the body housing for manually activating the probe, and a terminal separate and differently configured from the contact pins and the data transfer contacts for connecting the probe to a host computer.

16. The inventory control probe of claim 1, wherein the probe body housing is movably connected at the first end to the probe tip.

17. The inventory control probe of claim 1, wherein the probe tip has a frontwardly facing C-shaped portion, wherein the contact pins extend downwardly at spaced positions from an upper wall of the C-shaped portion, the C-shaped portion being configured for conforming engagement with the collar in a manner that brings the contact pins into contact with the first and second conductive rings.

18. The docking station of claim 4, wherein the electrical conductor further comprises an interconnecting line having a length sufficient to permit the docking station housing to be located at a location remote from the clip.

19. The docking station of claim 4, wherein the docking station housing comprises a base having the data transfer terminal contacts exposed thereon and a retaining arm for holding a control module inserted into the socket in contact with the data transfer terminal contacts.

20. The docking station of claim 4, wherein the clip is substantially C-shaped and the contact pins extend outwardly at spaced positions from the tip of the C-shaped clip, the C-shaped clip being configured for engagement with the collar in a manner that brings the contact pins into contact with the first and second conductive rings.

21. The docking station of claim 9, wherein the control module further comprises a plurality of indicators connected to the microprocessor of the control module for indicating operation modes, including a first mode wherein control module identification information matches identification information read from the collar, a second mode wherein control module identification information fails to match identification information read from the collar, and a third mode indicating failure of the control module to contact the resident memory of the collar.

* * * * *